United States Patent
Stafford et al.

(10) Patent No.: US 9,418,369 B2
(45) Date of Patent: Aug. 16, 2016

(54) SYSTEM AND METHOD FOR AUTOMATING PROACTIVE COMMUNICATION

(75) Inventors: Jeff Stafford, Overland Park, KS (US); Jeffrey Michael Sweeney, Olathe, KS (US); Kelsyn D. S. Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 969 days.

(21) Appl. No.: 13/611,348

(22) Filed: Sep. 12, 2012

(65) Prior Publication Data
US 2013/0006913 A1 Jan. 3, 2013

Related U.S. Application Data

(63) Continuation of application No. 12/483,523, filed on Jun. 12, 2009, now Pat. No. 8,290,890.

(51) Int. Cl.
| | |
|---|---|
| G06F 3/01 | (2006.01) |
| G06Q 10/06 | (2012.01) |
| G06F 3/08 | (2006.01) |
| H04M 3/493 | (2006.01) |
| G06Q 30/02 | (2012.01) |
| G06Q 10/10 | (2012.01) |
| H04M 3/42 | (2006.01) |
| H04L 12/58 | (2006.01) |
| G06F 3/0482 | (2013.01) |

(52) U.S. Cl.
CPC *G06Q 30/02* (2013.01); *G06F 3/01* (2013.01); *G06F 3/08* (2013.01); *G06Q 10/06* (2013.01); *G06Q 10/10* (2013.01); *H04M 3/42042* (2013.01); *H04M 3/493* (2013.01); *G06F 3/0482* (2013.01); *G06F 2212/171* (2013.01); *H04L 12/58* (2013.01)

(58) Field of Classification Search
None
See application file for complete search history.

(56) References Cited

U.S. PATENT DOCUMENTS

| | | | |
|---|---|---|---|
| 5,864,848 A * | 1/1999 | Horvitz et al. | |
| 7,103,154 B1 * | 9/2006 | Cannon et al. | 379/67.1 |
| 7,847,820 B2 * | 12/2010 | Vallone et al. | 348/143 |
| 8,290,890 B2 | 10/2012 | Stafford et al. | |
| 2010/0318486 A1 | 12/2010 | Stafford et al. | |

OTHER PUBLICATIONS

U.S. Appl. No. 12/483,523; Issue Notification dated Sep. 26, 2012; 1 page.
U.S. Appl. No. 12/483,523; Non-Final Rejection dated Mar. 21, 2012; 16 pages.
U.S. Appl. No. 12/483,523; Notice of Allowance dated Jun. 18, 2012; 20 pages.

* cited by examiner

*Primary Examiner* — Stanley K Hill
*Assistant Examiner* — Nathan Brown, Jr.
(74) *Attorney, Agent, or Firm* — Swanson & Bratschun, L.L.C.

(57) ABSTRACT

A system and method for automating proactive communication. The information for the desired contacts may be accepted from a user. A selection of contact communication frequency preferences may be received from a user. An automatic communication to one of the desired contacts may be initiated. The user may be allowed to cancel the automatic communication, in response to receiving a notification that the communication is about to begin. A response indicative of the communication status may be received. Rules and preferences may be optimized based upon the received response.

16 Claims, 5 Drawing Sheets

SYSTEM AND METHOD FOR AUTOMATING PROACTIVE COMMUNICATION

CROSS REFERENCE TO RELATED APPLICATION

This application is a continuation of U.S. patent application Ser. No. 12/483,523, filed Jun. 12, 2009 by Jeff Stafford et al. and entitled, "System and Method for Automating Proactive Communication," which is hereby incorporated by reference in its entirety.

BACKGROUND OF THE INVENTION

In business and in personal life, humans often fail to consistently keep in touch with important individuals. Even with the best of intentions, remembering each person and the last time you contacted them can be challenging. The result of a lack of communication is often that relationships fail and sales and customer satisfaction suffer. In the past, a person might have kept an address book containing lists of people and their contact information. More recently, most electronic mail (e-mail) applications include a version of the traditional address book that is often referred to as a contacts list. Simply having the contact information for friends, family, and business clients available does not ensure any consistent communication gets made.

BRIEF SUMMARY OF THE INVENTION

In one embodiment of the present invention, by providing an automated tool for initiating communication with contacts on a contact list, users are able to not only be reminded that a communication with a person is over due, but also have the communication automatically placed for them. In addition to organizing contact information and initiating communication with them, another important aspect is the optimization and continual refinement in when the communication is made. In one embodiment, based on actual success rate statistics from attempted communications as well as user-defined preferences, the automated tool is able to optimize which methods of communication is most successful, as well as the time and day of the week that is best to attempt the communication.

In one embodiment of the present invention, a system and method may be provided for automating proactive communication. The information for the desired contacts may be accepted from a user. A selection of contact communication frequency preferences may be received from a user. An automatic communication to one of the desired contacts may be initiated. The user may be allowed to cancel the automatic communication, in response to receiving a notification that the communication is about to begin. A response indicative of the communication status may be received. Rules and preferences may be optimized based upon the received response.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
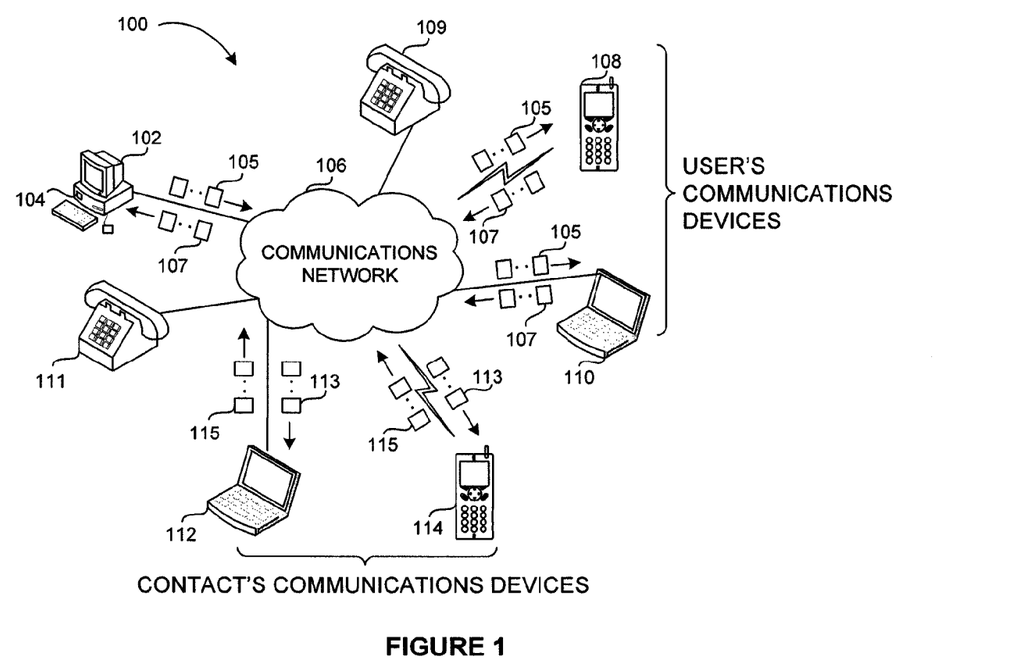
FIG. 1 is an illustration of one embodiment of an environment operable to provide automatic proactive communication, consistent with the present invention.

FIG. 1 is an illustration of one embodiment of an environment 100 operable to provide automatic proactive communication, consistent with the present invention. In one embodiment, an automatic proactive communicator 102 containing software modules 104 may communicate data packets 105 over a communications network 106 to a user's communications devices, which may include a wireless communications device 108, a landline telephone 109, or a computing device 110. The user's communications device that is to receive a data packet 105 may be determined by software located in the software modules 104 within the automatic proactive communicator 102. In one embodiment, the data packet 105 alerts a user through the use of one of the user communications devices that an attempt to communicate with one of their contacts is about to occur. The user, in response to receiving the data packet 105, may either choose to cancel the communication with the contact or allow the communication to go through. A return data packet 107 can be returned via the communications network 106 to the automatic proactive communicator 104. The return data packet 107 may be indicative of the user's choice to either allow the communication or abort the communication.

In one embodiment, in the situation where the user does not cancel the automatic communication to the contact, the data packet 113 may be delivered through the communications network 106 to one of the contact's communications devices. A contact's communications device may include a landline telephone 111, a computing device 112, or a wireless communications device 114. In other embodiments, any number of devices operable to communicate with the automatic proactive communicator 102 via the communications network 106 may also be included. A return data packet 115 may be communicated from one of the contact's communications devices via the communications network 106 to the automatic proactive communicator 102 in order to alert the automatic proactive communicator 102 as to whether or not the contact accepted the call or other message, or whether the user did not receive the communication.

The automatic proactive communicator 102 may be a standalone device such as a personal computer, laptop, server, network node, or any other computing device operable to perform the principals of the present invention. The software modules 104 may be located within the automatic proactive communicator 102, or they may be located anywhere connected to the communications network 106 that is in communication with the automatic proactive communicator 102. The software modules 104 will be described in greater detail below in reference to FIG. 6.

Data packets 105, 107, 113, and 115 may be any type of data packet that may be communicated over the communications network 106. In one embodiment, if the network is a LAN or the Internet, the data packets may be internet protocol (IP) packets. In another embodiment, the communications network 106 may be the public-switched telephone network (PSTN), in which case the data packets 105 may consist of analog signals, as is commonly known in the art. In other words, depending on the particular type of communications network 106 different types of data packets 105, 107, 113 and 115 may be used. The communications network 106 may be the Internet, a LAN, WAN, PSTN, wireless networks such as GSM or CDMA, or any other communications network operable to communicate between the automatic proactive communicator 102 and the user's and contact's communications devices.

In one embodiment, the user's communications devices may include a wireless communications device 108, a landline telephone 109, or a computing device 110. The wireless communications device 108 may be a cellular telephone, a PDA, or any other wireless communications device 108 operable to communicate over the communications network 106. A landline telephone 109 may be a traditional telephone operable to communicate over the PSTN, or may be an IP based phone operable to communicate over data networks, such as the Internet. The computing device 110 may be a laptop, PC, desktop, netbook, or any other computing device operable to communicate via the communications network 106 with the automatic proactive communicator 102. It should be understood that any other similar devices that are able to communicate messages with the automatic proactive communicator 102 may also be used in the present invention. In one embodiment, the contact's communications devices 111, 112, and 114 are similar to user's communications devices 108, 109, and 110. The difference between devices lies in whom the communications devices belong. Therefore, no separate description of the landline telephone 111, computing device 112, or wireless communications device 114 is provided.

Although it is not shown, in one embodiment, the user's communications device and the automatic proactive communicator 102 may be the same device. For example, if the automatic proactive communicator 102 also functions as a personal computer for the user, the user may not only set up contact information and other necessary inputs into the automatic proactive communicator 102, but may also use the automatic proactive communicator 102 for traditional personal computer computing uses. Therefore, at least in one embodiment, the automatic proactive communicator 102 and a computing device belonging to the user may be the same physical device. The method in which the automatic proactive communicator 102 decides which user communications device to use as well as which contact communication device to communicate with, will be described in greater detail below in reference to FIG. 3.

Figure 2:
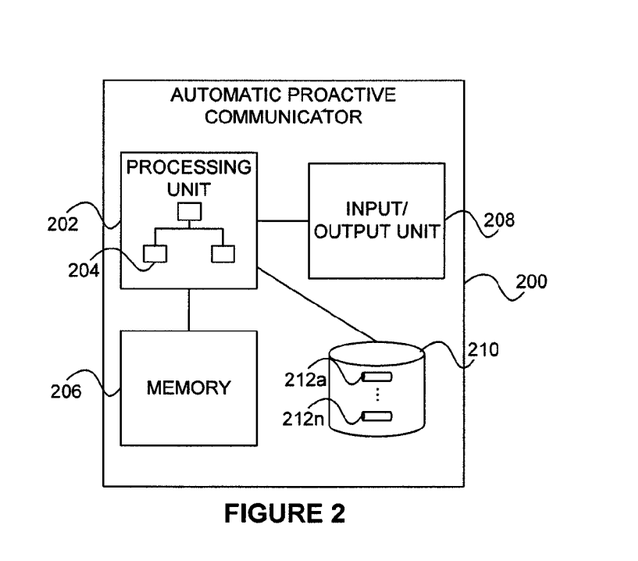
FIG. 2 is a block diagram depicting components of one embodiment of an automatic proactive communicator operable to provide for generating, initiating, and optimizing proactive communication.

FIG. 2 is a block diagram depicting components of one embodiment of an automatic proactive communicator 200 operable to provide for generating, initiating and optimizing proactive communication. The automatic proactive communicator 200 may include a processing unit 202 for processing data and accessing memory 206 or other database tables containing information regarding contacts, rules, and preferences. The processing unit 202 may execute software 204 operable to perform functionality of the automatic proactive communicator 200, including accepting contacts, initiating communications, optimizing communications, and other related functionality described below in greater detail. Software modules that operate in the software 204 are described below in more detail in reference to FIG. 6.

Memory 206 may also be located within the automatic proactive communicator 200 for storing data being processed by the processing unit 202. The automatic proactive communicator 200 may include an input/output (I/O) unit 208 for receiving and communicating data between communications devices, such as user's communications devices and contact's communications devices, and the automatic proactive communicator 200, over a communications network. A data storage unit 210 may be included in, or be in communication with the automatic proactive communicator 200. The data storage unit 210 may be a hard drive or any other type of volatile or non-volatile memory capable of storing data. Within the data storage unit 210 may be one or more data repositories 212a-212n (212), such as a database or multiple databases, capable of storing and organizing data. Some example data may include contact information, user preferences, and predefined rules, but any information may be stored within the data repositories 212. In one embodiment, rather than including the data storage unit 210, the automatic proactive communicator 200 may use a memory 206 that is large enough to store any necessary data.

Figure 3:
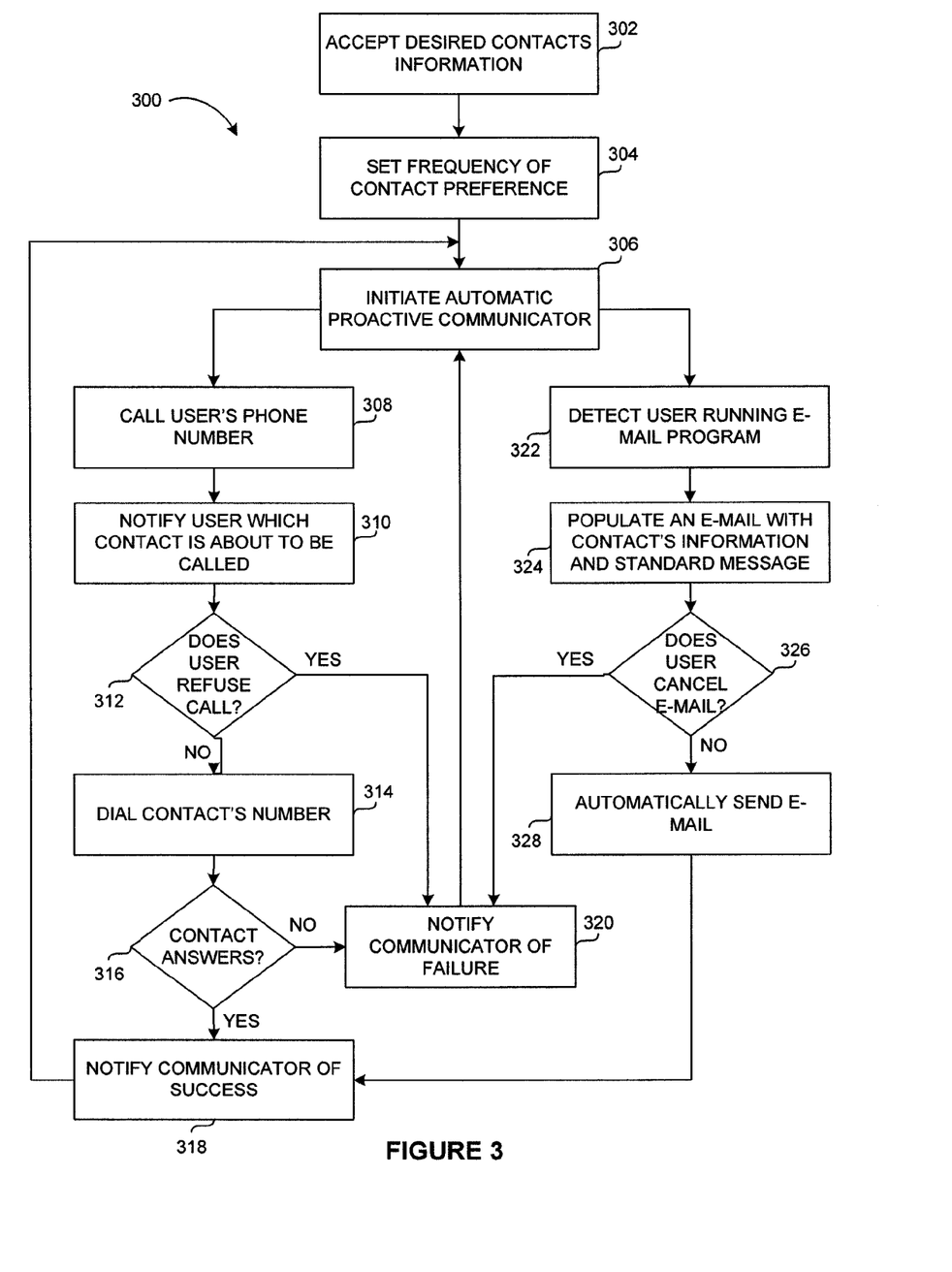
FIG. 3 is one embodiment of a flow diagram for generating, initiating, and optimizing proactive communication, consistent with the present invention.

FIG. 3 is one embodiment of a flow diagram 300 for generating, initiating, and optimizing proactive communication, consistent with the present invention. In one embodiment, in step 302, desired contacts information may be accepted by the automatic proactive communicator. In step 304, the user's preference for how frequently to communicate with a particular contact may be set into the automatic proactive communicator. The frequency may be daily, weekly, monthly, or any other period of time. More information regarding preferences and contacts setup will be described below in reference to FIG. 4. In step 306, the automatic proactive communicator may be initiated. Upon initiation, software modules within the automatic proactive communicator may run continuously or may be triggered to activate at certain times as needed for communication with the contacts.

The automatic proactive communicator may communicate in a variety of ways with the contacts that are entered in by the user. In one embodiment, one way to communicate with the user's contact is through the use of a telephone. In step 308, the automatic proactive communicator places a call to the user's telephone number. In step 310, the user answering the telephone is notified by the automatic proactive communicator which contact is about to be called. In one embodiment, the user may be notified by an automated recording generated by the automatic proactive communicator 102. In an alternative embodiment, the user may be notified via a display screen located on the user's telephone, similar to a caller ID display, or any other manner in which the telephone is able to alert the user as to the identity of the contact that is to receive the communication. In step 312, a determination may be made whether or not the user would like to abort the call. For example, the user may choose to hang up and not allow the call to continue on to the contact, the user may not answer the phone at all, which would also be seen as the user refusing the call, or the user may answer the call and choose not to hang up, in which case in step 314, the contact's number is dialed.

In step 316, a determination may be made as to whether or not the contact answered the phone call. If the contact does not answer the phone call, or if the user aborted the call previously, in step 320 the automatic proactive communicator may be notified of a failure to communicate with a contact.

Alternatively, in step 318, if the contact did answer the telephone call, the proactive communicator is notified of the success. Although it will be described below in greater detail, in one embodiment, notifying the automatic proactive communicator of failure or success each time an attempt to communicate with a contact is one useful metric for optimizing the proactive communications process. For example, using the contact's information, as well as the time of day and the day of the week if the call or other communication is successful, the automatic proactive communicator is likely to determine that that contact has a greater possibility of being reached at that particular time or day of the week for future communications. On the other hand, if the communication is unsuccessful, the automatic proactive communicator may likely use this information to determine not to attempt to try to communicate with the contact at that particular time or day, in the future.

Although the automatic proactive communicator may be operable to communicate many different types of messages to the user's communications devices, for simplicity, only one other example is given in FIG. 3. In one embodiment, an e-mail is attempted to be automatically communicated to a contact via the automatic proactive communicator. In step 322, the automatic proactive communicator may detect that a user is running their e-mail program, such as Microsoft Outlook or any other number of e-mail programs. When the automatic proactive communicator determines that it is an appropriate time to attempt a communication with a contact, in step 324, an e-mail may be automatically populated with the contact's information, and in some cases, a standardized greeting or message. The populated e-mail may then be displayed on the user's screen. The user may have the option to allow the message to proceed and be communicated to the contact, to cancel the e-mail message to the contact, or in one embodiment, the user may be able to edit the automatically populated e-mail before being communicated to the contact. Regardless of the message type—whether it be a telephone call, e-mail, instant message, voicemail, or any other type of message—the automatic proactive communicator is able to initiate, as well as communicate the message to contacts that have been set up within the automatic proactive communicator, without any assistance or other prodding by the user.

In an alternative embodiment, the automatic communicator may initiate the e-mail program, even if a user is not currently operating within, or have running, the e-mail program. This allows for contacts that are most likely to be available by e-mail to be contacted without user intervention or without respect to what programs are running.

In step 326, a determination is made as to whether or not the user chose to abort the sending of the e-mail. If the user does not cancel the e-mail, in step 328 the e-mail message is automatically sent to the contact and the automatic proactive communicator may be notified of the successful sending of the message. However, if the user cancels the e-mail, the automatic proactive communicator may be notified of the failure. Once again, the automatic proactive communicator may use the data regarding the success or failure of the message to be communicated in order to provide data to the various algorithms located within the software modules that enable the automatic proactive communicator to optimize communications with the user's contacts.

Figure 4:
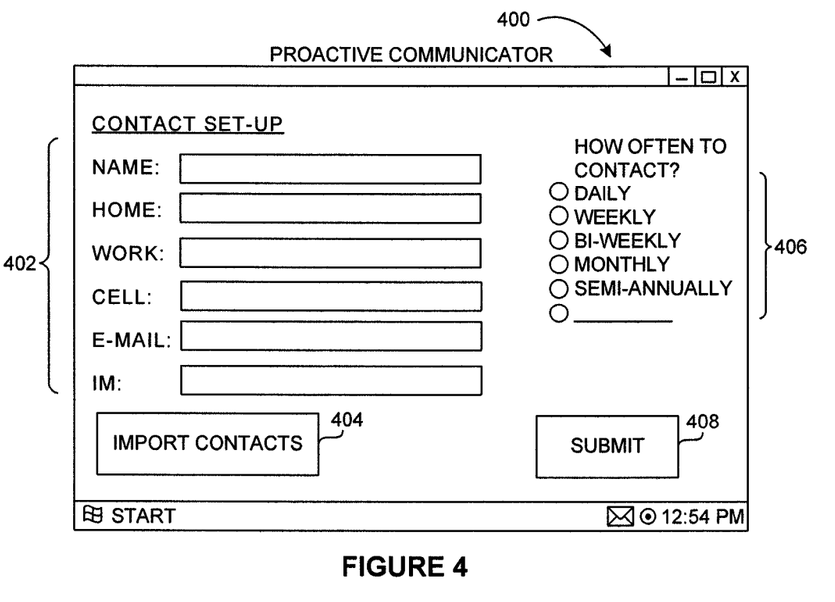
FIG. 4 depicts an illustration of one embodiment of a proactive communicator contact setup screen, consistent with the present invention.

FIG. 4 depicts an illustration of one embodiment of a proactive communicator contact setup screen 400, consistent with the present invention. In one embodiment, the proactive communicator contact set up screen 400 includes contact information fields 402, an import contacts button 404, communication frequency buttons 406, as well as a submit button 408. The contact information fields 402, in one embodiment, may include a name field that would include the contact's full name, a home field that would include the contact's home telephone number, a work field that would include the contact's work telephone number, a cell field that would contain the contact's cellular telephone number, an e-mail field that would contain the contact's e-mail address, and an IM field that would contain the contact's instant messenger user or screen name. A variety of other contact information may additionally be included within the proactive communicator contact setup screen 402. In one embodiment, a user may have a list of contacts associated with an address book or other program from which the automatic proactive communicator may import contact information. The import contacts button 404 may initiate an operation that would allow contacts to be imported into the automatic proactive communicator without having to have the user input each contact, as well as the information for each contact manually.

The communication frequency button 406 may include options such as daily, weekly, bi-weekly, monthly, semiannually, or a user defined period of time in which a user may select how often to communicate with a particular contact. Upon entry of a contact's information into the automatic proactive communicator, as well as other necessary input used in setting up the automatic proactive communicator, such as the frequency in which the user wishes to communicate with a contact, a user will no longer have to be concerned about letting relationships go without some form of regular communication. By including an interval chosen by the user, the user is able to best decide what scope of communication is appropriate on an individual basis. After entry of all the applicable fields with the contact's information, a user may select the submit button 408 in order to submit the contact's information to the automatic proactive communicator.

In alternative embodiments, the proactive communicator contact setup screen 400 may additionally include other input fields such as a preferred contact means, (e.g., e-mail), predetermined rules, such as no attempt to communicate with business contacts should be made on a weekend day, or any other number of set rules that the user chooses to set up from the beginning. In one embodiment, the automatic proactive communicator will, however, learn preferences of both the user and the contacts, individually and/or as a group, based on the received feedback such as being notified of success or failure of a communication at a particular time and on a particular day, and over time will learn to automatically make communication attempts that the user is more likely to accept.

Figure 5A:
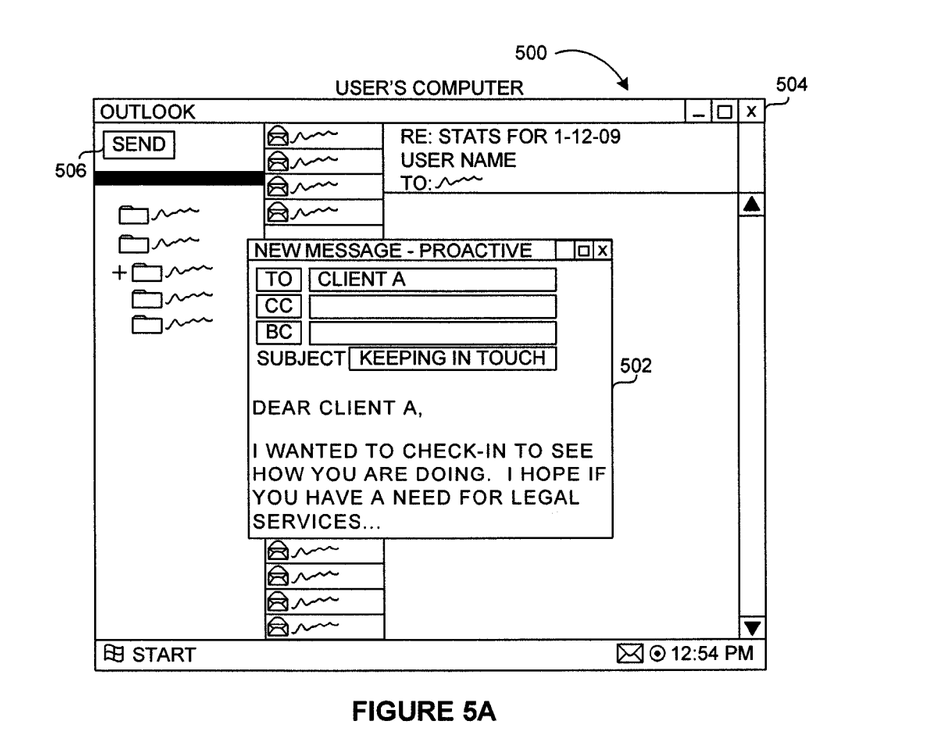
FIG. 5A depicts an illustration of one embodiment of a user's computer e-mail screen, consistent with the present invention.

FIG. 5A depicts an illustration of one embodiment of a user's computer e-mail screen 500 consistent with the present invention. In one embodiment, the user's computer e-mail screen 500 includes an e-mail composition screen 502 that is automatically displayed on the user's computer e-mail screen 500 in response to receiving a notification from the automatic proactive communicator to initiate an e-mail communication with a particular contact. The e-mail composition screen 502 may be populated with a contact's information, including the contact's e-mail address, as well as a preformatted e-mail message, which may be personalized for the particular contact. Upon seeing the e-mail composition screen 502 appear within the user's computer e-mail screen 500, a user may choose to abort the e-mail at the particular time and select the e-mail cancel button 504. Alternatively, the user may choose to communicate the e-mail message with the contact immediately by pressing the e-mail send button 506. Additionally, the user may do nothing, in which case, after a predetermined time or other parameter is met, in one embodiment, the e-mail message will be automatically sent to the contact as-is. In one embodiment, a user may click within the e-mail composition screen, which allows the user to edit the automatically generated e-mail before the message is communicated to the contact.

Figure 5B:
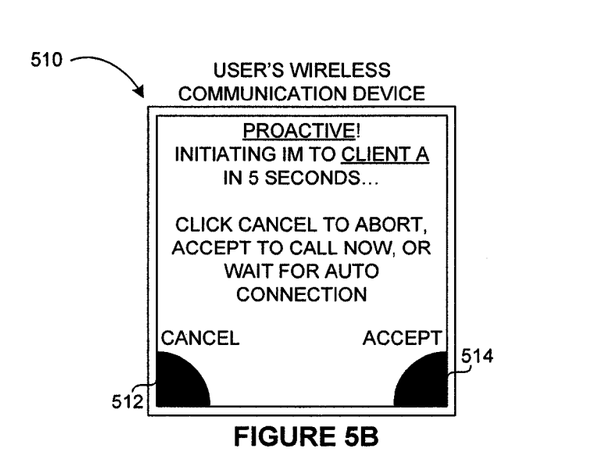
FIG. 5B depicts an illustration of one embodiment of a user's wireless communications device instant messaging screen, consistent with the present invention.

FIG. 5B depicts an illustration of one embodiment of a user's wireless communications device instant messenger screen 510, consistent with the present invention. The user's wireless communications device instant messaging screen 510 may display an instant message received from the proactive communications device that indicates which client the automatic proactive communicator is about to attempt to communicate an instant message with. In one embodiment, the user may choose to cancel the communication of the instant message to the contact, the user may accept the message as-is and request the wireless communications device to send the instant message to the contact by selecting the instant message accept button 514, the user may not select anything and wait for an automatic communication of the instant message, or the user may choose to edit the content of the instant message that is to be sent to the contact before the message is sent.

In another embodiment, although not depicted in a separate figure, a user may receive a telephone call, and upon answering the telephone call, a recorded voicemail or other message may alert the user of the identity of the contact that is about to be called, and give the user an opportunity to either stay on the line and have the call connected, or to hang up and cancel the call. By automatically initiating a telephone call to the user, the automatic proactive communicator allows the user to effortlessly keep in touch with the contacts without any additional effort on the user's part. If the user has time and wishes to talk to the contact, the user simply has to wait and will be connected to the contact. On the other hand, if the user is in a meeting or otherwise is occupied and cannot complete the communication at that time, the automatic proactive communicator will note the particular time and day and factor that into future determinations of when to attempt to contact that person, or any other person, in the future.

Figure 6:
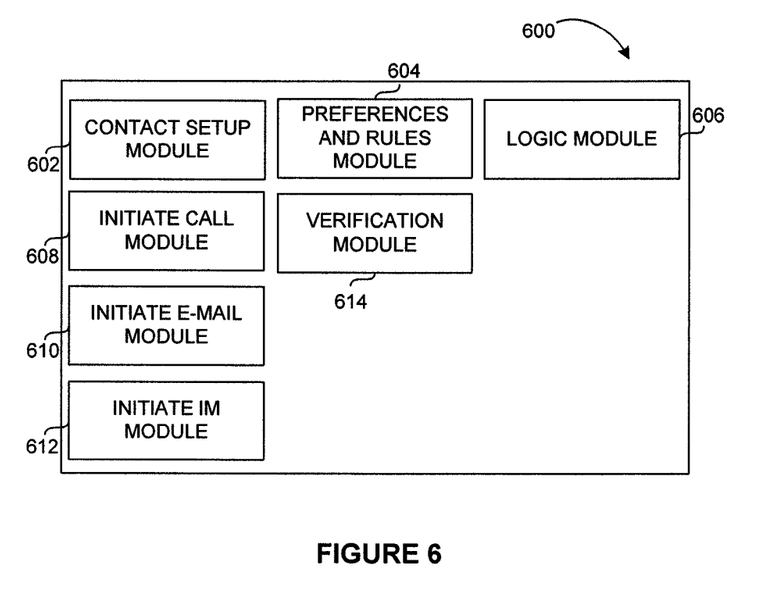
FIG. 6 is a block diagram of one embodiment of modules configured to setup, initiate, and optimize automated proactive communications.

FIG. 6 is a block diagram of one embodiment of modules 600 configured to set up, initiate, and optimize automatic proactive communications. In one embodiment, a contact setup module 602 may be included to allow a user of the automatic proactive communicator to enter contacts, as well as the contact information into the automatic proactive communicator. Generally, the contact setup module 602 will be initiated by the user and only used for the entry of users into the automatic proactive communicator, or upon editing a contact's information in the event changes are necessary to the contact's information previously entered.

A preferences and rules module 604 may additionally be included that would allow a user, either during the contact setup that occurs initially or during subsequent edits to a contact's information, to enter in preferences, or other rules. The preferences or rules may be related to the automatic proactive communications systems in general, all of the contacts in general, or to a particular contact. For example, if the user knows that he or she never wants to attempt a business contact communication on the weekends, contacts identified as a business contact may additionally include a rule within a record associated with that particular contact, or type of contacts, alerting the automatic proactive communicator not to select certain contacts during weekend attempts at communications. Many other different types of preferences or rules, such as time of day preferences, may also be entered using the preferences and rules module 604. In one embodiment, the preferences and rules module 604 may include references to the user's schedule, or calendar, with a preference being set automatically to not attempt communications during times indicated as busy or unavailable by the user within their calendar.

A logic module 606 may additionally be included, in one embodiment, to interpret statistics received over the communications network from the user's device as well as the contact's device, indicating success or failure of particular communication. Calculations made by the logic module may provide additional information to the preferences and rules module. To optimize the automatic proactive communication with the contacts, the logic module 606 may alternatively operate independent of the preferences and rules module 604. Some examples of various algorithms or other methods which may be used by the logic module to optimize the communications include parameter optimization, Bayes theorems of probability, heuristics, and other mathematical techniques. By using the algorithms, the automatic proactive communicator is able to increase the percentage of completed calls or other communication with contacts, as effectively as possible.

In one embodiment, the automatic proactive communicator includes an algorithm that executes Bayes theorems of probability to help determine the best time or day to call a particular contact. Bayes theorems, at least in the Bayesian interpretation, say that probabilities are rationally coherent degrees of belief, or a proposition's likelihood given a body of well-specified information. Additionally, Bayes theorem can be seen as a way of understanding how the probability that a theory is true is affected by a new piece of evidence. Related to the present invention, using a body of data of past calls, the likelihood of a person being available at particular time may be updated based on information received from future attempts at contacting a particular contact. For example, if a contact has only been available before 9 a.m. once, each additional attempt at communication with the contact prior to 9 a.m. would diminish the chances of the contact being available before 9 a.m. The automatic proactive communicator would eventually have enough data to determine that the contact should not be called before 9 a.m., to allow for the most efficient use of the user's time. Data may be compiled not only on the contact, but also on the availability of the user, as well. For example, if the user frequently aborts communication attempts between a set period of time (for example between 4 and 6pm), the algorithms may determine that it would be best to not attempt communications during these times. Each aborted attempt that is made during that time would be factored in to the calculation, ultimately leading to the decision by the automatic proactive communicator to not make calls during that period of time.

Similarly, in one embodiment, the automatic proactive communicator may include an algorithm that uses heuristics to determine which contact to attempt communication with at a particular time. A heuristic algorithm uses experience-based techniques that help in problem solving, learning and discovery. A heuristic method is particularly used to rapidly come to a solution that is hoped to be close to the best possible answer, or "optimal solution." Using more of a trial and error type approach, the automatic proactive communicator would maintain records of each contact and the date and time the contact was used in a communication attempt. While never being able to be certain that a contact is available, using heuristics, a determination may be made by the automatic proactive communication as to which contacts are more likely to be available at any given time. Other techniques, such as parameter optimization, which are commonly known in the art for determining probabilities or helping in decision making may also be used, although not specifically described herein.

Several initiation modules, such as an initiate call module 608, initiate e-mail module 610, and initiate IM module 612, may also be included within the automatic proactive communicator. When the automatic proactive communicator determines that, based upon the preferences and rules generated from past experience or the information available, a communication attempt for particular contact should occur, the automatic proactive communicator will execute either the initiate call module 608, initiate e-mail module 610, or initiate IM module 612, to initiate their respective communication method. For example, if a particular contact only had an e-mail address, the initiate e-mail module 610 would be the only module that would make sense to the automatic proactive communicator to call. Alternatively, if information for the contact is known for the telephone number, e-mail address or instant messenger, based upon learned experience as determined by the logic module or other means, one of the initiate modules 608-612 may be called to initiate the communication.

A verification module 614 may be included in one embodiment to receive results from both the user devices and the contact device. The verification module, in one embodiment, verifies whether or not the communication was successful as well as collect experimental results and data such as the time and day of the week and then updates the preferences and rules module 604 based upon the results of the received information. In other embodiments, the logic module 606 may receive the data from the verification module 614 to either separately, or additionally, process the information before sending it to the preferences and rules module 604. It is to be noted that any of the individual modules in an embodiment may be combined or otherwise not present, and similar functionality may be performed by other modules located within the automatic proactive communicator.

Figure 7:
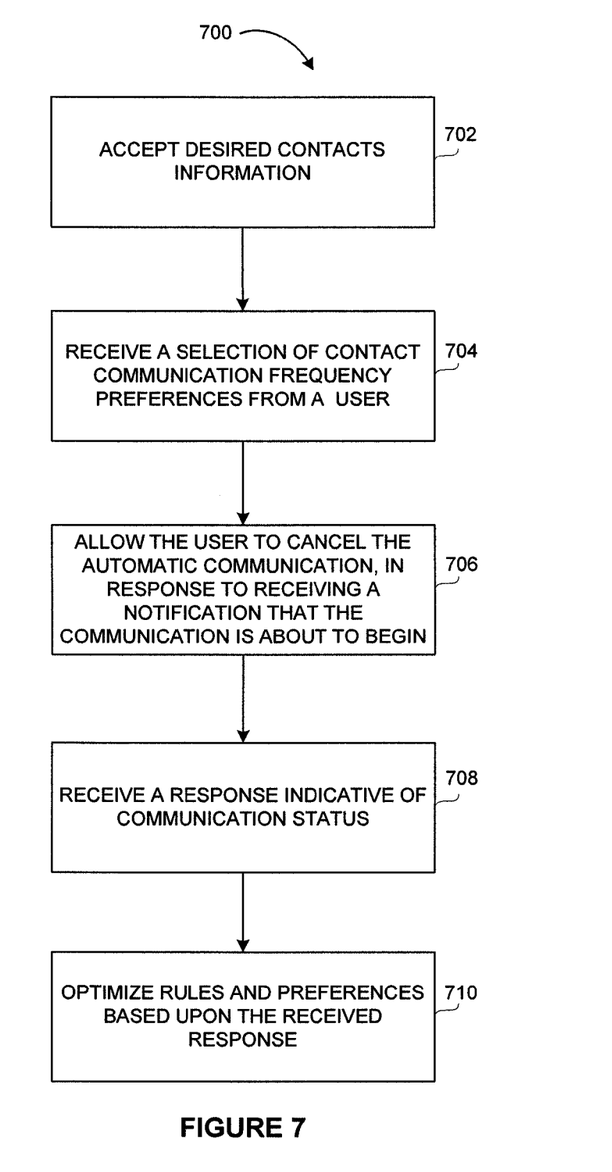
FIG. 7 is a flowchart of one embodiment of a method for automating proactive communication.

FIG. 7 is a flow chart of one embodiment of a method 700 for automating proactive communication. In one embodiment, in step 702, desired contact's information may be accepted by the automatic proactive communicator. The desired contact's information may be manually entered by a user or automatically generated from another contact list accessible to the automatic proactive communicator. In step 704, a selection of contact communication frequency preferences may be received from a user. Examples of contact communication frequency preferences may include daily, weekly, bi-weekly, monthly, semiannually or any other period of time which the user feels is an appropriate amount of time to go between communication with a particular contact. For a family member, such as a parent, a shorter frequency may be entered by the user whereas a business contact may only need to hear from the user on a monthly or bi-monthly basis.

In step 706, in one embodiment, an automatic communication may be initiated to one of the desired contacts. The automatic communication may be an e-mail, text message, instant message, phone call, voicemail, or any other type of communication in which both the automatic proactive communicator is operable to generate, as well as the contact is operable to receive from the user. In step 708, in response to receiving a notification that the communication is about to begin, the user may be allowed to abort the automatic communication. For example, if the automatic proactive communicator is attempting to connect a telephone call between the user and their contact, upon hearing or seeing which contact is about to be communicated with, the user may simply hang up and cancel the communication from occurring.

In step 710, a response indicative of a communication status may be received. The automatic proactive communicator may use various modules located within the software to evaluate the responses received from both the user's communications devices, as well as the contact's communications devices. In step 712, based upon the received responses, rules and preferences may be optimized by the automatic proactive communicator to ensure that future communications with a particular contact, or with the contacts in general, are more likely to be successful. There are many different optimization techniques, such as the ones described previously, which may be implemented. However, any information received that goes towards causing a greater probability for a communication to be successful, advances the chances of the user being a more effective proactive communicator.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for automating proactive communication, said method including:
   accepting desired contacts information;
   receiving a selection of contact communication frequency preferences from a user;
   initiating an automatic communication to one of the desired contacts, wherein initiating an automatic communication to one of the desired contacts includes initiating an e-mail that is pre-generated to include unique details regarding the contact;
   allowing the user to cancel the automatic communication in response to receiving a notification that the communication is about to begin;
   receiving a response indicative of the communication status; and
   optimizing rules and preferences based upon the received response.

2. The method according to claim 1, wherein desired contacts include business clients.

3. The method according to claim 1, wherein initiating an automatic communication to one of the desired contacts includes initiating a phone call.

4. The method according to claim 1, wherein receiving a response indicative of the communication status includes receiving a response indicating that the communication was not successful based on user refusal.

5. The method according to claim 1, wherein receiving a response indicative of the communication status includes receiving a response indicating that the communication was not successful based on contact failure.

6. The method according to claim 1, wherein optimizing rules and preferences includes optimizing the rules and preferences based on experiential results.

7. The method according to claim 6, wherein optimizing rules and preferences includes optimizing the rules and preferences based on experiential results as well as Bayes' theorems of probability.

8. The method according to claim 6, wherein experiential results are based on both a response from the user as well as a response from the contact.

9. An automatic proactive communication system, said system comprising:
- a processor;
- a memory;
- data being stored by the memory and accessible by the processor;
- wherein the processor is configured to:
  - accept desired contacts information;
  - receive a selection of contact communication frequency preference from a user;
  - initiate an automatic communication to one of the desired contacts wherein initiating an automatic communication to one of the desired contacts includes initiating an e-mail that is pre-generated to include unique details regarding the contact;
  - allow the user to cancel the automatic communication, in response to receiving a notification that the communication is about to begin;
  - receive a response indicative of the communication status; and
  - optimize rules and preferences based upon the received response.

10. The system according to claim 9, wherein desired contacts include business clients.

11. The system according to claim 9, wherein, in initiating an automatic communication to one of the desired contacts, the processor is configured to initiate a phone call.

12. The system according to claim 9, wherein, in receiving a response indicative of the communication status, the processor is configured to receive a response indicating that the communication was not successful based on user refusal.

13. The system according to claim 9, wherein, in receiving a response indicative of the communication status, the processor is configured to receive a response indicating that the communication was not successful based on contact failure.

14. The system according to claim 9, wherein, in optimizing rules and preferences, the processor is configured to optimize the rules and preferences based on experiential results.

15. The system according to claim 14, wherein, in optimizing rules and preferences, the processor is configured to optimize the rules and preferences based on experiential results as well as Bayes' theorems of probability.

16. The system according to claim 14, wherein experiential results are based on both a response from the user as well as a response from the contact.

* * * * *